Feb. 19, 1963   S. B. BLODGETT ET AL   3,077,940
SELF-TARING NET WEIGHER
Filed July 15, 1958   2 Sheets-Sheet 1

INVENTORS
Stewart B. Blodgett
BY Fred D. Sher
AGENT

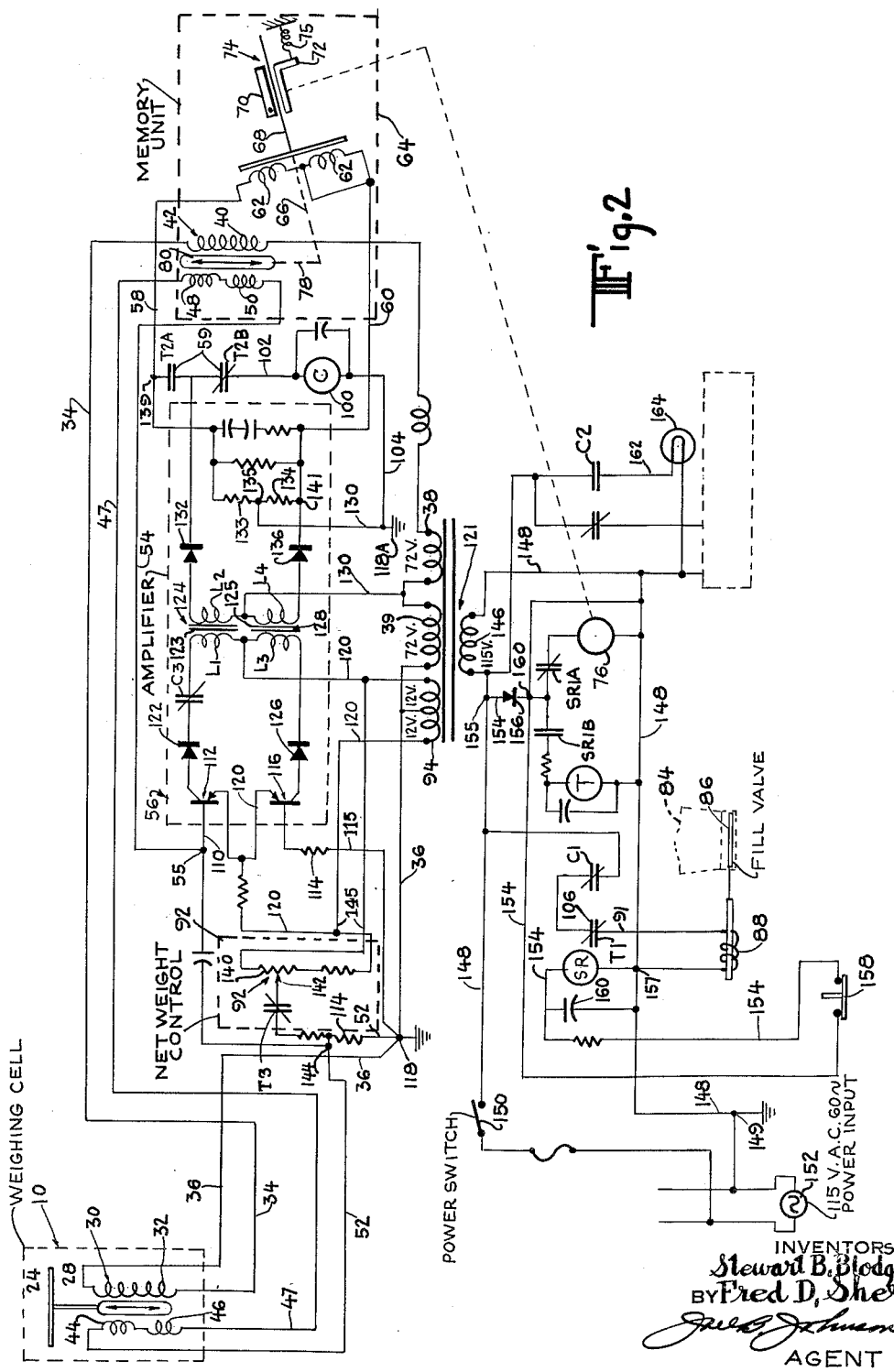

United States Patent Office 3,077,940
Patented Feb. 19, 1963

3,077,940
SELF-TARING NET WEIGHER
Stewart B. Blodgett, Cedar Grove, N.J., and Fred D. Sher, New York, N.Y., assignors, by mesne assignments, to Foils Packaging Corporation, a corporation of Ohio
Filed July 15, 1958, Ser. No. 748,723
6 Claims. (Cl. 177—165)

This invention is directed to a weighing system, and particularly to a system in which the tare weight of a package is automatically eliminated from consideration and in no way disturbs the net weight of the material weighed.

In weighing and packaging articles or materials for commercial distribution, it is often desirable to provide a fixed net weight for a successive number of packages, although the tare weight of each package may vary. Furthermore, in the packaging of certain products, it is often desirable to add extraneous items to each package, such as coupons or premiums. The weight of these items, which may vary from package to package, obviously cannot be allowed to affect the net weight of the product in each package. Also, in some applications, spilled material collects on the scale pan and its weight must be prevented from affecting the net weight of each package.

It is, therefore, an object of the invention to provide a novel weighing system in which it is possible to accurately control the net weight of the material packaged.

It is a further object of the invention to provide a novel weighing system for accurately controlling the net weight of a package irrespective of the tare weight of the package container or of any extraneous items.

It is a further object of the invention to provide a novel weighing system, which will accurately provide a predetermined net weight of a quantity of material, irrespective of the weight of the container of the package or extraneous items.

Another object of the invention is to provide a novel weighing system, in which the tare weight may be accurately eliminated from the control of the net weight of material.

It is another object of the invention to provide a novel weighing system in which the tare weight of a package can be accurately eliminated from the control of the net weight of a material to be packaged.

The invention essentially consists of a weighing device, which includes a support member, movable in response to a first load, which may consist of the container of a package and any extraneous items or material. The weighing device includes a portion, which moves with the load support to initiate a first electrical signal proportional to the weight of the first load. This signal provides movement of a moving coil armature of a memory device, which in turn provides a second electrical signal of equal and opposite phase to the first electrical signal for stopping the moving armature in a position corresponding to the weight of the first load. Means are provided for clamping the moving coil of the memory device in the position to which it has been moved. Loading means are provided for filling the container, when supported on the scale, with material representing a second load having a predetermined weight. An electrical circuit controls the loading of the material into the container and includes an adjustment device which renders the loading means inoperative when the weight of the second load reaches the predetermined value.

FIG. 2 is a schematic circuit diagram of the control mechanism of the weighing system in accordance with the invention.

Figure 1:
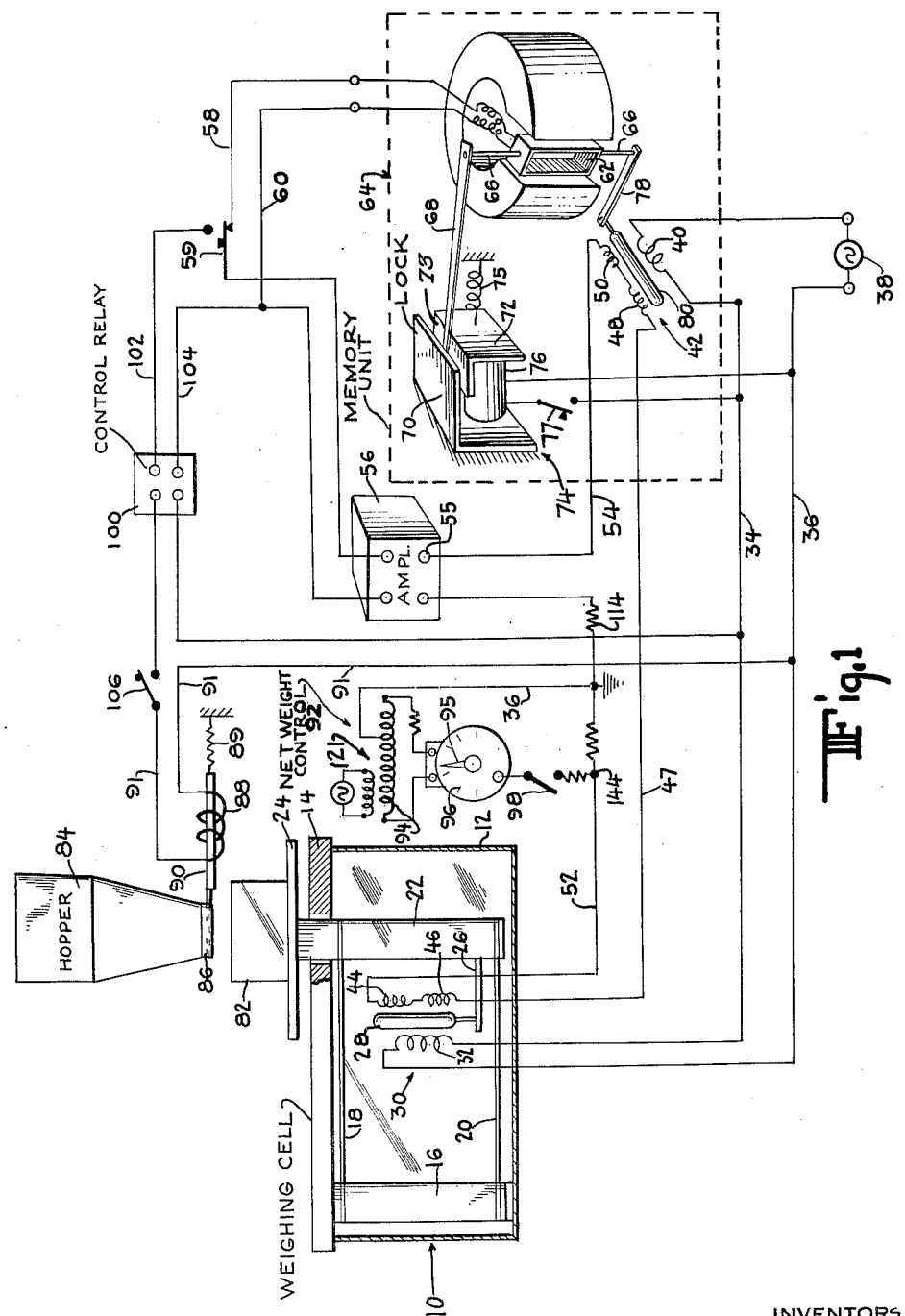
FIG. 1 is a schematic showing of the novel weighing system in accordance with the invention.

In FIG. 1, there is disclosed a weighing system, in accordance with the invention, which includes a weighing scale or cell 10. The weighing scale includes a housing 12 rigidly supporting a cover plate 14, to which is fixedly suspended a support block 16. Rigidly fixed at one end to support block 16 are a pair of cantilever springs 18 and 20. Springs 18 and 20 comprise thin sheet metal strips arranged substantially horizontally and parallel to each other. The other ends of springs 18 and 20 are fixed to a movable block 22, which to its upper end is fixed a load support plate 24.

Due to the flexing of springs 18 and 20, the movable block 22 will move downwardly in a vertical direction, as a load is placed on the support plate 24. Because of the parallelogram arrangement of springs 18 and 20 and blocks 16 and 22, block 22 will always remain parallel to block 16. Fixed at the bottom end of block 22 is a support arm 26, to which is rigidly fastened a movable core 28 of a differential transformer 30, mounted, as shown in FIG. 1, between the springs 18 and 20.

Differential transformer 30 consists of a primary coil 32 connected in series by conductors 34 and 36 to a source of alternating current indicated at 38 and to the primary coil 40 of a second differential transformer 42 forming part of a memory unit. The secondary winding of differential transformer 30 comprises a pair of coils 44 and 46, connected in series with each other and by a conductor 47 with the secondary coils 48 and 50 of the secondary windings of differential transformer 42.

The secondary coils of transformers 30 and 42 are respectively connected by conductors 52 and 54 to an amplifier circuit represented by block 56, to provide an input to the amplifier. The output of the amplifier circuit 56 is connected by conductors 58 and 60 through a two-way switch 59 to a moving coil 62 of the memory unit 64. Fixed at one end to a shaft 66 supporting the moving coil 62, is a rigid vane or arm 68. The other end of arm 68 is positioned between a fixed plate 70 and a portion 73 of a pivotably movable L-shaped armature of a locking device 74. The armature has another portion 72 positioned adjacent to one end of a solenoid 76, which during operation attracts armature portion 72 against a spring 75. The pivotal mounting of the armature may be horizontal pivots located at the corner of portions 72 and 73. Shaft 66 of the movable motor coil 62 is joined by a linkage 78 to the movable core 80 of the differential transformer 42.

Both of the differential transformers 30 and 42 are of the type in which the secondary coils are connected in phase opposition. The movable cores 28 and 80 respectively, provide in each transformer a magnetic coupling between the primary coils 32 and 40 of the transformers and the respective secondary coils. Each core at a null position aids in inducing, in the secondary coils of the respective transformer, equal and opposite currents which buck out or neutralize each other. If the movable core of one of the differential transformers is moved in one direction from its null position between the secondary coils, it will increase the induced current in one of the secondary coils of the transformer and reduce the induced current in the other secondary coil. This results in a flow of current in the circuit of the secondary coils, which has a given phase relationship with the current in the primary coil. Movement of the core in the opposite direction will reduce the greater of the induced currents and increase the value of the lesser of the induced currents of the secondary coils. As the core passes the null point between the secondary coils, the induced current of the other secondary coil becomes greater and provides a current flow in the secondary coil circuit of opposite phase than from that of the first induced current. When the core is centered or at a null position between the secondary coils, the voltage induced in the secondary coils are equal and opposite and thus provide a zero voltage or null, and no current will flow in the circuit of the secondary coils of the transformer.

In operation, if an empty container 82 is placed on the scale support 24, the weight of the container will cause the supporting block 22 to move downwardly and carry movable core 28 with it. As described above, a current flow is induced in the circuit of the secondary transformer coils 44 and 46 having a specific magnitude and phase relationship with the current flowing through the primary coil 32. This current is amplified by the amplifier 56 to provide a current to coil 62 of the memory unit 64, which causes the coil 62 to turn in a specific direction. The movement of coil 62 moves core 80 of differential transformer 42 in a direction to induce a current in the secondary circuit of the differential transformers of opposite phase to that induced by the movement of core 28. When the two induced currents in the secondary circuit are equal, motion of moving coil 62 ceases and since there is no restoring force, coil 62 will remain in the position to which it was driven.

If switch 77 in the circuit of the locking unit 74 is now closed, coil 76 will operate to lock arm 68 of the memory unit in the position to which the arm 68 was moved by the motion of coil 62 and between the fixed armature 70 and the upper face 73 of movable armature 72.

There is provided a hopper 84 for the purpose of holding material to be filled into container 82. At the bottom of hopper 84 is a fill valve 86, which is pressed by spring 89 into a closed position to prevent any material flowing from the hopper 84. Valve 86, which may consist merely of a slide closing outlet of hopper 84 is moved into open position by a solenoid 88 having a movable core 90, to which the slide valve 86 is attached.

A net weight control device 92 consists of a variable resistor (140 in FIG. 2) connected to a source of alternating current (not shown in FIG. 1) having the same phase as the alternating current source 38. Control device is connected at 144 through switch 98 into the circuit of the secondary transformer coils. The net weight control device 92 has a graduated dial 96, by which the variable resistor is set to provide a predetermined voltage input into the circuit of the transformer secondary coils which is opposite in phase to that provided by the differential transformer 30. This voltage input from the net weight control 92 represents a specific weight of material to be filled into container 82. Closing of switch 98 will permit the set voltage of control 92 to be applied to amplifier 56.

To weigh a specific amount of material into container 82, switch 59 is moved to its upward position (in FIG. 1) to disconnect the moving coil 62 from the amplifier 56 and to connect the output of the amplifier to a normally closed switch of control relay 100. With the output voltage of differential transformer 30 neutralized by the output voltage of differential transformer 42 and due to the design of amplifier 56, the voltage applied to the amplifier by the net weight control 92 prevents any current flow through relay 100, which maintains circuit 91 closed at this point. Switch 106 in circuit 91 is also closed so that operation of solenoid 88 will open the hopper valve 86. As the container 82 is filled, differential transformer 30 establishes an output voltage opposite in phase to that applied to amplifier 56 by the net weight control 92. When this output voltage of transformer 30 becomes equal to that applied by the net weight control current will flow to the control relay 100, which will then operate to open circuit 91 and deenergize solenoid 88. Valve 86 is now closed by spring 89 to cut off the flow of material into container 82.

FIG. 1 only schematically shows certain parts of the novel system. The weighing cell 10 has been described by way of example only and, since its details do not constitute a part of this invention, it is believed that further description is unnecessary. Weighing cell 10 may be of the type disclosed and described in copending application Serial No. 704,077, filed December 20, 1957, by Fred D. Sher and David D. Stueck. It is readily understood, however, that other types of weighing cells may be used to provide a signal output signal from the differential transformer 30. It is recognized that the hopper 84 as well as the solenoid operated hopper valve 86 may be replaced by any equivalent structure and for the same purposes.

FIG. 2 is a schematic circuit diagram of applicants' invention and includes an arrangement which provides semiautomatic operation of the weighing system set forth in FIG. 1. Similar reference numerals are used in FIG. 2 to indicate the same structure disclosed in FIG. 1.

Conductor 54 of the circuit of the secondary coils of the differential transformers 30 and 42 is connected at terminal 55 to a lead 110 connected to the base of a first PNP transistor 112. Lead 52 of the secondary coil circuit of the differential transformers is tied to ground through terminal 144 and resistor 114. A second PNP transistor 116 is also tied to ground at 118 through lead 115. Transistors 112 and 116 are part of the amplifier 56 and are connected into a circuit 120 leading from a secondary winding 94 of a transformer 121. Circuit 120 has one parallel branch including, in series, transistor 112, a rectifier 122, a normally closed switch C3 and a control winding L1 of a first magnetic amplifier 124. A second parallel branch of circuit 120 includes the transistor 116 connected in series with a rectifier 126 and a control winding L3 of a second magnetic amplifier 128. Magnetic amplifiers 124 and 128, respectively, include output windings L2 and L4, respectively, connected in different parallel branches of a circuit 130, which includes a secondary winding 39 of transformer 121. Secondary winding 39 is connected at one end to ground at 118 through lead 36. One parallel branch of circuit 130 includes the output winding L2 connected in series with a rectifier 132, a normally open switch T2A, terminal 139 and a resistor 133 tied to terminal 135. The other parallel branch of circuit 130 includes in series the output winding L4 of magnetic amplifier 128, a rectifier 136, terminal 141 and a resistor 134 connected at one end to terminal 135, which in turn is grounded at 118A. The moving coil 62 of the memory unit 64 is shunted across resistances 133 and 134 through connectors 58 and 60, respectively, connected to the circuit 130 at 139 and 141. Differences of potential between points 139 and 141 will cause a current flow through the moving coil 62 in one direction or the other.

The magnetic amplifiers 124 and 128 both include a magnetic core 123 and 125, respectively, upon which coils L1, L2, L3 and L4 are wound. The rectifiers 132 and 136 provide unidirectional current flow through coils L2 and L4, respectively, of current induced by the secondary winding 39 of the power transformer 121. Due to the action of rectifiers 122 and 126 in circuit 120, unidirectional currents also flow through the control windings of L1 and L3, respectively. The material of cores 123 and 125 is so chosen that a small current flow through coils L1 and L3 will prevent current flow through coils L2 and L4, respectively, while with no current flow through L1 and L3, a maximum current will flow through the coils L2 and L4, respectively.

Since the base of transistor 116 is tied through resistor 114 to ground, the signal voltage applied to terminal point 55 by the output of the circuit of the secondary coils of the differential transformers is always relative to ground. The circuit arrangement is such that a signal of one phase applied at terminal point 55 will be amplified to drive the moving coil 62 in one direction, while a signal voltage of opposite phase will drive the moving coil 62 in the opposite direction. This is due to the fact that a voltage applied at 55 will cause currents of different magnitude to flow through coils L1 and L3, respectively, which will initiate currents of different amounts through coils L2 and L4, respectively. This results in a voltage difference between terminal points 139 and 141 setting up a flow of current through the coil 62. The control currents through L1 and L3 are smaller than those which will cut off all current flow through L2 and L4, respectively.

The net weight control 92, shown in FIG. 2, consists of a variable resistance 140 connected by conductors 145 across the secondary winding 94 of transformer 121. The adjustable terminal 142 of the net weight control is connected through a normally closed switch T3 to a terminal point 144 connected by lead 52 into the circuit of the secondary coils of the differential transformers 30 and 42. With switch T3 closed, a preselected voltage can be applied at terminal 144 and of a phase opposite to that established by the output signal of differential transformer 30, when a load is placed on the scale support 24.

The primary winding 146 of transformer 121 is connected in a power circuit 148 in series with a power switch 150 to a source 152 of alternating current such as a 115 volt, 60 cycle current. As indicated, circuit 148 is connected at one point 149 to ground as a reference point.

An operating circuit 154 is connected at terminal points 155 and 157 across the branches of power circuit 148. Alternating current from circuit 148 is rectified by a rectifier 156 in circuit 154 to provide an unidirectional flow of current through circuit 154. Connected in series in circuit 154 is a normally closed interrogate switch 158 and a slow release relay SR.

The operation of the weighing system disclosed in FIG. 2 is one in which the power switch 150 is first closed to pass current through the pimary winding 146 of power transformer 121. Since the interrogate switch 158 is normally closed, a unidirectional current will flow through circuit 154 to operate a solenoid (not shown) of the slow release relay SR. Operation of relay SR closes a normally open switch SR1B to pass current from terminal 160 in circuit 154 through the coil (not shown) of a relay T. At the same time, a normally closed switch SR1A is opened so that no current passes from terminal 160 through the solenoid (not shown) of locking relay 76. The passing of current through relay T causes to open a normally closed switch T1 in the circuit 91 of the fill valve solenoid 88. Also the operation of relay T will close the normally opened switch T2A to connect the circuit of output coil L2 to the terminal point 139. Also, normally closed switch T2B is opened at this point to prevent current flow through conductor 162 to the coil (not shown) of control relay 100 indicated at C. Operation of relay T also opens the normally closed switch T3 to disconnect net weight control 92 from the input terminal 144.

The operator first places an empty container on the scale support 24 of the weighing cell 10. The output signal voltage of differential transformer coils 44 and 46 is applied at terminal 55. This signal is amplified in the manner described above, to provide a voltage difference between terminal points 139 and 141 and a flow of current through the galvanometer motor coil 62 to move the coil 62 in one direction. The movement of coil 62 continues until the movable core 80 of differential transformer 42 reaches a position providing an equal voltage of opposite phase, so that the input voltage at terminal 55 becomes zero and the motion of coil 62 stops.

The operator sets the adjustable resistor 140 to provide a voltage at terminal 144 corresponding to a desired net weight of material to be filled into the empty container. This may be done by a pointer 95 (FIG. 1) connected to adjustable terminal 142 and a suitably calibrated scale 96. The operator now opens the interrogate switch 158 to keep circuit 154 open and relay SR inoperative until the container has been filled with the material to be weighed. The relay SR is connected in its circuit in parallel with a 10 microfarad condenser 160, which provides a time delay in the action of the spring release of relay SR. This time delay permits the arm 68 of the memory unit 64 to attain its operative position before it is locked in place. When the relay SR is fully released and becomes inoperative, normally closed switch SR1A is now spring pressed into closed position to operate the solenoid 76 of the locking device 74 to hold the arm 68 in its operative position.

The release of relay SR also permits the opening of the normally opened switch SR1B to cut off a current flow through the control relay T. When relay T becomes inoperative, normally closed switch T1 in the fill valve circuit 91 is allowed to close, while normally opened switch T2A opens and normally closed switch T2B closes. The operation of switches T2A and T2B cuts off the output of amplifier coil L2 from terminal 139 and connects the output of coil L2 to control relay C(100). Switch T3 is also allowed to be spring-pressed into closed position to connect the circuit of the net weight control 92 to the input terminal 144.

With switches T1 and C1 normally closed in circuit 91, fill valve solenoid 88 is operated to open fill valve 86 and to permit material to flow into the container 82. However, with an unbalanced voltage placed by the net weight control 92 on terminal 144, current flow through L1 prevents current flow through amplifier coil L2 and the control relay C remains inoperative. This continues until the secondary coils 44 and 46 of differential transformer 30 provide an equal and opposite output voltage in the secondary circuit of the differential transformers to that provided by the net weight control 92. At this point, there is zero voltage input at terminal 55, and with no current flow through coil L1, current flows through the circuit of amplifier coil L2 to operate relay C.

The operation of relay C opens the normally closed switch C1 in the fill valve solenoid circuit 91 to stop the feeding of material into the container 82. Simultaneously, a normally opened switch C2 in circuit 162 is closed by relay C to permit current flow from circuit 148 through an indicating light 164, to indicate to the operator the termination of the filling of container 82. Also, normally closed switch C3 in the circuit of amplifier input coil L1 is opened by relay C to prevent current flow through L1 and to thus retain current flow through the circuit of L2 and relay C to hold relay C operative.

The operator then releases normally closed switch 158 to close the circuit 154. This, then, operates the slow release relay SR, which closes switch SR1B to operate the relay T. Also, switch SR1A is opened by relay SR to release the locking device 74 and to permit repositioning of the arm 68 when a new container 82 is placed on the scale support 24. The operation of relay T opens switch T1 in the fill valve solenoid circuit 91 and closes switch T2A to connect the amplifier output coil L2 to the circuit of galvanometer motor coil 62. Simultaneously, switch T2B is opened by relay T to disconnect the control relay C from the circuit of amplifier output coil L2. Switch T3 is also opened by relay R to disconnect the net weight control potentiometer 140 from the input terminal 144. In this manner, the weighing system is prepared for a repetition of the weighing cycle, as described above. The rendering of relay C inoperative permits the closing of normally closed switch C1 in the fill valve solenoid circuit 91 and the opening of normally opened switch C2 in the indicator light circuit 162 to turn the indicator light 164 off. Also, normally closed switch C3 closes to permit current flow through coil L1 to operate the magnetic amplifier 126.

The above disclosed weighing system thus provides an important feature, in that the net weight of the material in a container is accurately controlled to a predetermined fixed amount regardless of the tare weight of the container. The material feeding mechanism, thus, accurately introduces the desired net weight of a product into one or more containers. The invention, furthermore, provides a weighing system, in which the tare weight is accurately recorded and eliminated from the net weight determination and with the use of only a single weighing cell. This provides both an economy of apparatus as well as time in the control of the weight of a product. The complete separating of the tare weight from the net weight consideration enables the use of containers of varying weight, as well as the addition to the empty container of extraneous items such as premiums or prizes. Also, with certain types of materials, spilling occurs over a period of continued use. The collection of spilled material on the scale pan 24 is also automatically eliminated from any consideration of the net weight of the material fed into the container.

The system provides a minimum of effort by an operator and is completely automatic during a single cycle of operation, since the operator needs merely to operate the interrogate switch to set in motion a cycle of operation. It is recognized that both the feeding of an empty container to the weighing cell 10 as well as the removal of a filled container from the weighing cell may be performed automatically by well known feeding devices. For less elaborate installations it is obvious that the feeding of the container to and from the weighing cell may be performed manually.

We claim:

1. A control system comprising a memory unit including a movable arm, power means connected to said movable arm and operative to move said arm, control means connected to said power means and including a differential transformer having a movable core and a pair of secondary coils, means connecting said movable core to said movable arm to be moved therewith, a circuit including said secondary coils, and means for generating a first alternating current flow in said circuit to operate said power means to move said arm and core, means including said movable core for generating a second alternating current flow in said circuit equal to and of opposite phase to said first alternating current flow to stop said movable arm in a position corresponding to the value of said first alternating current flow, and locking means to hold said movable arm in said position whereby the generation of said second alternating current flow is retained in said circuit, said locking means comprising a fixed element and a movable element spaced therefrom, means mounting said elements with the space therebetween in the path of movement of said arm.

2. A weighing system comprising a weighing cell including a movable support for a load, a memory unit including a movable coil having an arm affixed thereto, a pair of differential transformers having primary and secondary windings connected in series relationship respectively, an electrical circuit including the secondary windings and said movable coil, the first differential transformer having an armature mechanically connected with said movable support for generating a signal in said electrical circuit for moving said coil proportional to the movement of said support, the second differential transformer having an armature mechanically connected to said movable coil for generating an antithetical signal in said series circuit to stop said coil at a distance proportional to the movement of said support, locking means for clamping the arm and connected armature in said position, and relay means for sequentially connecting said movable coil to said electrical circuit, then actuating said locking means to clamp said arm, and then disconnecting said movable coil from said electrical circuit.

3. A weighing system comprising a weighing cell including a movable support for a load, a memory unit including a movable coil having an arm affixed thereto, a pair of differential transformers having primary and secondary windings connected in series relationship respectively, an electrical circuit including the secondary windings and said movable coil, the first differential transformer having an armature mechanically connected with said movable support for generating a signal in said electrical circuit for moving said coil proportional to the movement of said support, the second differential transformer having an armature mechanically connected to said movable coil for generating an antithetical signal in said series circuit to stop said coil at a distance proportional to the movement of said support, locking means including a fixed member and a movable member spaced therefrom for clamping the arm and the connected armature in said position, loading means for adding a second load to said movable support, and relay means for automatically sequentially actuating said locking means, then disconnecting said movable coil from said electrical circuit, then adding a voltage in series with said secondary windings which is proportional to the desired weight of said second load, then actuating said loading means to start loading and finally terminating the operation of said loading means.

4. A weighing system comprising a weighing cell including a movable support for a load, a memory unit including a movable coil having an arm affixed thereto, a pair of differential transformers having primary and secondary windings connected in series relationship respectively, an electrical circuit including the secondary windings and said movable coil, the first differential transformer having an armature mechanically connected with said movable support for generating a signal in said electrical circuit for moving said coil porportional to the movement of said support under a first load, the second differential transformer having an armature mechanically connected to said movable coil for generating an antithetical signal in said series circuit to stop said coil at a distance proportional to the movement of said support under said first load, locking means for clamping the arm and connected armature in said position corresponding to said first load, loading means for adding a second load to said movable support, including a mechanical load control and a control circuit for activating said load control, said control circuit including a predetermined signal source electrically connected to said secondary windings of said first differential transformer, said signal source having an output voltage proportional to the desired weight of said second load.

5. A weighing system comprising a weighing cell including a movable support for a load, a memory unit including a movable coil having an arm affixed thereto, a pair of differential transformers having primary and secondary windings connected in series relationship respectively, an electrical circuit including the secondary windings and said movable coil, the first differential transformer having an armature mechanically connected with said movable support for generating a signal in said electrical circuit for moving said coil proportional to the movement of said support, the second differential transformer having an armature mechanically connected to said movable coil for generating an antithetical signal in said series circuit to stop said coil at a distance proportional to the movement of said support, locking means including a fixed member, a movable member and an actuating member for clamping the arm and connected armature between said fixed member and said movable member in said position, loading means for adding a second load to said movable support including a load control and activating means for said load control, said activating means including an adjustable device connected to said load control for rendering said loading inoperative when the weight of said second load reaches a predetermined value, said load control activating means including means for adding a voltage in series with said secondary windings proportional to said predetermined value.

6. A weighing system comprising a weighing cell including a movable support for a load, a memory unit including a movable coil having an arm affixed thereto, a coils L2 and L4, respectively. This results in a voltage difference between terminal points 139 and 141 setting up a flow of current through the coil 62. The control currents through L1 and L3 are smaller than those which will cut off all current flow through L2 and L4, respectively.

The net weight control 92, shown in FIG. 2, consists of a variable resistance 140 connected by conductors 145 across the secondary winding 94 of transformer 121. The adjustable terminal 142 of the net weight control is connected through a normally closed switch T3 to a terminal point 144 connected by lead 52 into the circuit of the secondary coils of the differential transformers 30 and 42. With switch T3 closed, a preselected voltage can be applied at terminal 144 and of a phase opposite to that established by the output signal of differential transformer 30, when a load is placed on the scale support 24.

The primary winding 146 of transformer 121 is connected in a power circuit 148 in series with a power switch 150 to a source 152 of alternating current such as a 115 volt, 60 cycle current. As indicated, circuit 148 is connected at one point 149 to ground as a reference point.

An operating circuit 154 is connected at terminal points 155 and 157 across the branches of power circuit 148. Alternating current from circuit 148 is rectified by a rectifier 156 in circuit 154 to provide an unidirectional flow of current through circuit 154. Connected in series in circuit 154 is a normally closed interrogate switch 158 and a slow release relay SR.

The operation of the weighing system disclosed in FIG. 2 is one in which the power switch 150 is first closed to pass current through the pimary winding 146 of power transformer 121. Since the interrogate switch 158 is normally closed, a unidirectional current will flow through circuit 154 to operate a solenoid (not shown) of the slow release relay SR. Operation of relay SR closes a normally open switch SR1B to pass current from terminal 160 in circuit 154 through the coil (not shown) of a relay T. At the same time, a normally closed switch SR1A is opened so that no current passes from terminal 160 through the solenoid (not shown) of locking relay 76. The passing of current through relay T causes to open a normally closed switch T1 in the circuit 91 of the fill valve solenoid 88. Also the operation of relay T will close the normally opened switch T2A to connect the circuit of output coil L2 to the terminal point 139. Also, normally closed switch T2B is opened at this point to prevent current flow through conductor 102 to the coil (not shown) of control relay 100 indicated at C. Operation of relay T also opens the normally closed switch T3 to disconnect net weight control 92 from the input terminal 144.

The operator first places an empty container on the scale support 24 of the weighing cell 10. The output signal voltage of differential transformer coils 44 and 46 is applied at terminal 55. This signal is amplified in the manner described above, to provide a voltage difference between terminal points 139 and 141 and a flow of current through the galvanometer motor coil 62 to move the coil 62 in one direction. The movement of coil 62 continues until the movable core 80 of differential transformer 42 reaches a position providing an equal voltage of opposite phase, so that the input voltage at terminal 55 becomes zero and the motion of coil 62 stops.

The operator sets the adjustable resistor 140 to provide a voltage at terminal 144 corresponding to a desired net weight of material to be filled into the empty container. This may be done by a pointer 95 (FIG. 1) connected to adjustable terminal 142 and a suitably calibrated scale 96. The operator now opens the interrogate switch 158 to keep circuit 154 open and relay SR inoperative until the container has been filled with the material to be weighed. The relay SR is connected in its circuit in parallel with a 10 microfarad condenser 160, which provides a time delay in the action of the spring release of relay SR. This time delay permits the arm 68 of the memory unit 64 to attain its operative position before it is locked in place. When the relay SR is fully released and becomes inoperative, normally closed switch SR1A is now spring pressed into closed position to operate the solenoid 76 of the locking device 74 to hold the arm 68 in its operative position.

The release of relay SR also permits the opening of the normally opened switch SR1B to cut off a current flow through the control relay T. When relay T becomes inoperative, normally closed switch T1 in the fill valve circuit 91 is allowed to close, while normally opened switch T2A opens and normally closed switch T2B closes. The operation of switches T2A and T2B cuts off the output of amplifier coil L2 from terminal 139 and connects the output of coil L2 to control relay C(100). Switch T3 is also allowed to be spring-pressed into closed position to connect the circuit of the net weight control 92 to the input terminal 144.

With switches T1 and C1 normally closed in circuit 91, fill valve solenoid 88 is operated to open fill valve 86 and to permit material to flow into the container 82. However, with an unbalanced voltage placed by the net weight control 92 on terminal 144, current flow through L1 prevents current flow through amplifier coil L2 and the control relay C remains inoperative. This continues until the secondary coils 44 and 46 of differential transformer 30 provide an equal and opposite output voltage in the secondary circuit of the differential transformers to that provided by the net weight control 92. At this point, there is zero voltage input at terminal 55, and with no current flow through coil L1, current flows through the circuit of amplifier coil L2 to operate relay C.

The operation of relay C opens the normally closed switch C1 in the fill valve solenoid circuit 91 to stop the feeding of material into the container 82. Simultaneously, a normally opened switch C2 in circuit 162 is closed by relay C to permit current flow from circuit 148 through an indicating light 164, to indicate to the operator the termination of the filling of container 82. Also, normally closed switch C3 in the circuit of amplifier input coil L1 is opened by relay C to prevent current flow through L1 and to thus retain current flow through the circuit of L2 and relay C to hold relay C operative.

The operator then releases normally closed switch 158 to close the circuit 154. This, then, operates the slow release relay SR, which closes switch SR1B to operate the relay T. Also, switch SR1A is opened by relay SR to release the locking device 74 and to permit repositioning of the arm 68 when a new container 82 is placed on the scale support 24. The operation of relay T opens switch T1 in the fill valve solenoid circuit 91 and closes switch T2A to connect the amplifier output coil L2 to the circuit of galvanometer motor coil 62. Simultaneously, switch T2B is opened by relay T to disconnect the control relay C from the circuit of amplifier output coil L2. Switch T3 is also opened by relay R to disconnect the net weight control potentiometer 140 from the input terminal 144. In this manner, the weighing system is prepared for a repetition of the weighing cycle, as described above. The rendering of relay C inoperative permits the closing of normally closed switch C1 in the fill valve solenoid circuit 91 and the opening of normally opened switch C2 in the indicator light circuit 162 to turn the indicator light 164 off. Also, normally closed switch C3 closes to permit current flow through coil L1 to operate the magnetic amplifier 126.

The above disclosed weighing system thus provides an important feature, in that the net weight of the material in a container is accurately controlled to a predetermined fixed amount regardless of the tare weight of the container. The material feeding mechanism, thus, accurately introduces the desired net weight of a product into one or more containers. The invention, furthermore, provides a weighing system, in which the tare weight is accurately recorded and eliminated from the net weight determination and with the use of only a single weighing cell. This provides both an economy of apparatus as well as time in the control of the weight of a product. The complete separating of the tare weight from the net weight consideration enables the use of containers of varying weight, as well as the addition to the empty container of extraneous items such as premiums or prizes. Also, with certain types of materials, spilling occurs over a period of continued use. The collection of spilled material on the scale pan 24 is also automatically eliminated from any consideration of the net weight of the material fed into the container.

The system provides a minimum of effort by an operator and is completely automatic during a single cycle of operation, since the operator needs merely to operate the interrogate switch to set in motion a cycle of operation. It is recognized that both the feeding of an empty container to the weighing cell 10 as well as the removal of a filled container from the weighing cell may be performed automatically by well known feeding devices. For less elaborate installations it is obvious that the feeding of the container to and from the weighing cell may be performed manually.

We claim:

1. A control system comprising a memory unit including a movable arm, power means connected to said movable arm and operative to move said arm, control means connected to said power means and including a differential transformer having a movable core and a pair of secondary coils, means connecting said movable core to said movable arm to be moved therewith, a circuit including said secondary coils, and means for generating a first alternating current flow in said circuit to operate said power means to move said arm and core, means including said movable core for generating a second alternating current flow in said circuit equal to and of opposite phase to said first alternating current flow to stop said movable arm in a position corresponding to the value of said first alternating current flow, and locking means to hold said movable arm in said position whereby the generation of said second alternating current flow is retained in said circuit, said locking means comprising a fixed element and a movable element spaced therefrom, means mounting said elements with the space therebetween in the path of movement of said arm.

2. A weighing system comprising a weighing cell including a movable support for a load, a memory unit including a movable coil having an arm affixed thereto, a pair of differential transformers having primary and secondary windings connected in series relationship respectively, an electrical circuit including the secondary windings and said movable coil, the first differential transformer having an armature mechanically connected with said movable support for generating a signal in said electrical circuit for moving said coil proportional to the movement of said support, the second differential transformer having an armature mechanically connected to said movable coil for generating an antithetical signal in said series circuit to stop said coil at a distance proportional to the movement of said support, locking means for clamping the arm and connected armature in said position, and relay means for sequentially connecting said movable coil to said electrical circuit, then actuating said locking means to clamp said arm, and then disconnecting said movable coil from said electrical circuit.

3. A weighing system comprising a weighing cell including a movable support for a load, a memory unit including a movable coil having an arm affixed thereto, a pair of differential transformers having primary and secondary windings connected in series relationship respectively, an electrical circuit including the secondary windings and said movable coil, the first differential transformer having an armature mechanically connected with said movable support for generating a signal in said electrical circuit for moving said coil proportional to the movement of said support, the second differential transformer having an armature mechanically connected to said movable coil for generating an antithetical signal in said series circuit to stop said coil at a distance proportional to the movement of said support, locking means including a fixed member and a movable member spaced therefrom for clamping the arm and the connected armature in said position, loading means for adding a second load to said movable support, and relay means for automatically sequentially actuating said locking means, then disconnecting said movable coil from said electrical circuit, then adding a voltage in series with said secondary windings which is proportional to the desired weight of said second load, then actuating said loading means to start loading and finally terminating the operation of said loading means.

4. A weighing system comprising a weighing cell including a movable support for a load, a memory unit including a movable coil having an arm affixed thereto, a pair of differential transformers having primary and secondary windings connected in series relationship respectively, an electrical circuit including the secondary windings and said movable coil, the first differential transformer having an armature mechanically connected with said movable support for generating a signal in said electrical circuit for moving said coil porportional to the movement of said support under a first load, the second differential transformer having an armature mechanically connected to said movable coil for generating an antithetical signal in said series circuit to stop said coil at a distance proportional to the movement of said support under said first load, locking means for clamping the arm and connected armature in said position corresponding to said first load, loading means for adding a second load to said movable support, including a mechanical load control and a control circuit for activating said load control, said control circuit including a predetermined signal source electrically connected to said secondary windings of said first differential transformer, said signal source having an output voltage proportional to the desired weight of said second load.

5. A weighing system comprising a weighing cell including a movable support for a load, a memory unit including a movable coil having an arm affixed thereto, a pair of differential transformers having primary and secondary windings connected in series relationship respectively, an electrical circuit including the secondary windings and said movable coil, the first differential transformer having an armature mechanically connected with said movable support for generating a signal in said electrical circuit for moving said coil proportional to the movement of said support, the second differential transformer having an armature mechanically connected to said movable coil for generating an antithetical signal in said series circuit to stop said coil at a distance proportional to the movement of said support, locking means including a fixed member, a movable member and an actuating member for clamping the arm and connected armature between said fixed member and said movable member in said position, loading means for adding a second load to said movable support including a load control and activating means for said load control, said activating means including an adjustable device connected to said load control for rendering said loading inoperative when the weight of said second load reaches a predetermined value, said load control activating means including means for adding a voltage in series with said secondary windings proportional to said predetermined value.

6. A weighing system comprising a weighing cell including a movable support for a load, a memory unit including a movable coil having an arm affixed thereto, a pair of differential transformers having primary and secondary windings connected in series relationship respectively, an electrical circuit including the secondary windings and said movable coil, the first differential transformer having an armature mechanically connected with said movable support for generating a signal in said electrical circuit for moving said coil proportional to the movement of said support under a first load, the second differential transformer having an armature mechanically connected to said movable coil for generating an antithetical signal in said series circuit to stop said coil at a distance proportional to the movement of said support under said first load, locking means for clamping the arm and connected armature in said position corresponding to said first load, loading means for adding a second load to said movable support, including a mechanical load control and a control circuit for activating said load control, said control circuit including an adjustable signal source electrically connected to said secondary windings of said first differential transformer, to maintain said load control open until the signal from said secondary windings of said first differential transformer is equal in value and opposite in phase to said adjustable signal, and closing means for said load control.

References Cited in the file of this patent

UNITED STATES PATENTS

| | | |
|---|---|---|
| 1,028,851 | Bard | June 11, 1912 |
| 2,085,345 | Tuttle et al. | June 29, 1937 |
| 2,610,052 | Macgeorge | Sept. 9, 1952 |
| 2,801,874 | Macgeorge | Aug. 6, 1957 |